United States Patent [19]

De La Croi Habimana

[11] Patent Number: 5,627,252
[45] Date of Patent: May 6, 1997

[54] SILYL GROUP CONTAINING ORGANIC POLYMERS

[75] Inventor: Jean De La Croi Habimana, S. Glamorgan, United Kingdom

[73] Assignee: Dow Corning S. A., Seneffe, Belgium

[21] Appl. No.: 568,897

[22] Filed: Nov. 30, 1995

[30] Foreign Application Priority Data

Dec. 1, 1994 [GB] United Kingdom .................. 9424247

[51] Int. Cl.$^6$ .................................................. C08G 77/18
[52] U.S. Cl. ........................... 528/26; 528/17; 528/18; 528/34
[58] Field of Search ................... 528/26, 41, 17, 528/18, 34

[56] References Cited

U.S. PATENT DOCUMENTS

| | | | |
|---|---|---|---|
| 4,331,797 | 5/1982 | Martin | 528/26 |
| 4,631,322 | 12/1986 | Isayama et al. | 525/480 |
| 4,786,667 | 11/1988 | Shimizu et al. | 523/435 |
| 4,810,759 | 3/1989 | Ryntz | 525/440 |
| 4,847,357 | 7/1989 | Shimizu | 528/374 |
| 4,873,272 | 10/1989 | Shimizu et al. | 523/212 |
| 4,877,855 | 10/1989 | Nagaoka et al. | 528/26 |
| 4,889,903 | 12/1989 | Baghdachi | 528/17 |
| 4,933,415 | 6/1990 | Shimizu et al. | 528/27 |
| 4,950,707 | 8/1990 | Shimizu et al. | 524/609 |

*Primary Examiner*—Margaret W. Glass
*Attorney, Agent, or Firm*—Roger H. Borrousch

[57] ABSTRACT

Polymers are prepared by reaction between a polymer prepared by reaction between (A) an OH terminated reaction product of a polyacid chloride and an organic polymer having substituent groups condensable therewith and (B) a silane or siloxane having a group capable of reaction with substituent groups of the reaction product (A). Reaction product (A) is preferably derived from a polyoxyalkylene glycol and a diacid chloride. Silane or siloxane (B) is preferably an epoxy silane and preferably has at least one silicon-bonded hydrolysable group. Preferred polymers are employed in moisture curable composition, e.g. as sealants.

8 Claims, No Drawings

SILYL GROUP CONTAINING ORGANIC POLYMERS

This invention is concerned with silyl group containing organic polymers.

It is known to provide polyoxyalkylenes with terminal groups containing a silicon atom and silicon-bonded hydrolysable groups through which curing reaction may be induced.

Numerous methods of preparing such polymers by introducing hydrolysable silyl groups into the molecular chain have been proposed in the literature. For example, a silane having silicon-bonded hydrolysable groups X and a silicon-bonded hydrogen atom of the general formula $X_{(3-b)}R_bSiH$ may be reacted with a polyether having groups including a —C=C— bond. There may be one or more —C=C— bonds present in the polyether molecule and these may be located as terminal groups on the chain or as pendant groups. In the case where there is one terminal —C=C— group, the other terminal group or groups may be hydroxyl. Materials of this general type have been mentioned in several patent specifications of which the earliest known to the applicant is G.B. 1 058 385. G.B. 1 058 385 specifies various organic groups which may provide the hydrolysable group corresponding to X in the above formula, namely hydrocarbonoxy, halohydrocarbonoxy, acyloxy, halogenated acyloxy, primary, secondary or tertiary amino groups in which the substituents are hydrocarbon or halo-hydrocarbon radicals or a diorgano-substituted isocyanoxy group of the general formula $R_xY_yC=N—O$ in which $R_x$ and $R_y$ are the same or different and are each a hydrocarbon or halo-hydrocarbon group. Numerous subsequent proposals for materials and methods of making them have been described in the art. These proposals include methods of preparing organic polymers by introducing hydrolysable silyl groups into the molecular chain which include, for example, those in which (1) a monomer having an epoxy group and a silicon-containing hydrolysable group e.g. gamma-glycidoxypropyl-methyldimethoxysilane or gamma-glycidoxypropyltrimethoxy-silane is copolymerised with an alkylene oxide e.g. propylene oxide or ethylene oxide to produce a polyether having a hydrolysable silicon-containing group in the side chains; (2) a polyoxyalkylene glycol such as polyoxypropylene polyol or polytetramethylene diol is reacted with a compound having a functional group e.g. an isocyanato group, capable of reacting with a hydroxyl group of the polyoxyalkylene polyol and having a silicon-containing hydrolysable group, thereby introducing a hydrolysable silicon-containing group into the polymer chain end, and (3) a polyisocyanate compound is reacted with a hydroxyl group of a polyoxyalkylene polyol as in (2) to produce a compound having an isocyanato group and the produced compound reacted with a compound having both a silicon-containing hydrolysable group and a group capable of reacting with the isocyanato group such as a carboxyl, hydroxyl, mercapto or amino group, thereby introducing a hydrolysable silicon-containing group into the polymer chain end.

Prior art methods of preparing modified polyethers of which applicant is aware generally employ energy intensive processes or a plethora of raw materials or operating steps in order to produce polymer with at least one silicon-containing group. See, for example, E.P. 159 605, U.S. Pat. No. 4,873,272, U.S. Pat. No. 4,847,357 and U.S. Pat. No. 4,786,667.

Those prior art processes which rely on a hydrosilylation reaction require use of a noble metal catalyst e.g a platinum derivative. The platinum catalysts employed are comparatively expensive so that the processes are comparatively costly.

It is one object of the present invention to provide an improved process for preparing silyl group containing organic polymers.

The present invention provides in one of its aspects a polymer prepared by reaction between (A) an OH terminated reaction product of a poly-acid chloride and an organic polymer having substituent groups condensible therewith and (B) a silane or a siloxane having a group capable of reaction with substituent groups of the reaction product (A).

A polymer prepared according to the invention requires use of a reaction product (A) having OH substituent end-groups condensible with a reactive group of (B). The condensation with the silane or siloxane is preferably carried out in the liquid phase either with the polymer in solution or more preferably using a polymer which is liquid at the temperature of the reaction. Thus, we prefer to employ a reaction product (A) having a molecular weight of less than 200,000 and when making polymers for use in sealants, adhesives or coatings we prefer to use a reaction product having a molecular weight of from 500 to about 100,000. Suitable reaction products may be formed by condensing a polyacid chloride with an organic condensation or addition polymer having substituent groups condensible therewith, for example hydroxyl, mercapto or amino groups. Organic polymers having suitable substituent groups are available in commerce and include the polyoxyalkylenes (e.g. polyoxyethylene, polyoxypropylene, polyoxybutylene, polyoxyethyleneoxypropylene) and polyalkylenes (e.g. polybutadiene and polyisobutylene). These materials may be linear or branched and may have one, two, three or more condensible substituents per molecule. We prefer to employ the linear, dihydroxy materials.

Polyacid chlorides which may be used to form the required reaction product (A) have two or more acid chloride groups, for example oxalyl, malonyl, glutaryl, adipoyl, phthalyl, terephthalyl and isophthalyl chlorides. We prefer to employ an a,w diacid chloride of a saturated aliphatic dicarboxylic acid of the formula

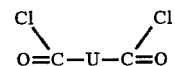

in which U represents a divalent hydrocarbon group and is preferably —$(CH_2)_s$-where s has a value from 0 to 10, more preferably from 3 to 5 as exemplified by glutaryl dichloride and adipoyl dichloride (m=3 or s=4). The polyacid chloride serves to link polymer chains of the organic polymer. The chain extension reaction, forming an ester linkage between e.g. oxyalkylene chains, is favoured when the ratio of chlorine of the acid chloride to the substituent end-groups of the organic polymer condensible therewith is close to 1 whereas the reaction to produce substituent end groups to the copolymer polyether-ester is favoured when the ratio is less than 1.

Thus, in preparing the reaction product (A) having an OH substituent end group, one may conduct an initial step of chain extending a comparatively short chain polymer to the desired extent by reacting the poly-acid chloride and polymer having substituent groups condensible therewith in proportions such that the ratio of chlorine of the acid chloride to substituent groups of the organic polymer condensible therewith permits a desired proportion of chain extension. We prefer to use the commonly available hydroxyl terminated polyoxypropylenes and polyoxyethylene-oxypropylenes having chain units

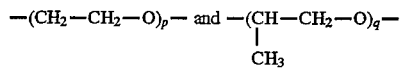

where p has a value of 0 to about 100 and q has value 1 to 300 and having a molecular weight in the range of about 57 to 4,000 (preferably 2,000 to 4,000) to provide a basis for the reaction product (A) of appropriate molecular weight and to react these with the preferred polyacid chloride in proportions such that the ratio of chlorine of the acid chloride to the hydroxyl groups of the organic polymer is not greater than 1. We prefer to eliminate the condensation product (e.g. HCl) formed during this reaction, for example by vacuum pump stripping or by entrapment in KOH solution.

The polymer prepared according to the invention requires a silane or a siloxane (B) having at least one group (X') capable of reaction with substituent hydroxyl groups of the reaction product (A) and may also have monovalent hydrocarbon group substituents R or hydrolysable group substituents R'. The monovalent hydrocarbon group R may be selected from the group consisting of alkyl groups, for example methyl, ethyl, and propyl aryl groups, for example phenyl, or aralkyl groups. The hydrolysable group R' may be selected from, for example, the group consisting of oximo, alkoxy (including alkoxy-alkoxy), acetoxy and alkenyloxy groups. The group X' capable of reaction with hydroxyl groups of the reaction product (A) may be selected from alkoxy, oximo and epoxy groups and is preferably an epoxy group of the general formula

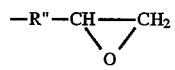

wherein R" is an alkylene group or a divalent ether group most preferably —(CH$_2$)$_3$—O—CH$_2$—. When preparing materials intended for use in moisture curable compositions, we prefer that the silane or siloxane is an alkoxy or epoxy-silane or siloxane in which one, two or three of the substituent groups are hydrolysable groups.

Preferred polymers according to the invention may be made according to the scheme

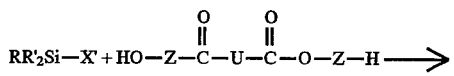

where R, R' and X' are as aforesaid, Z represents —(EO)$_p$(PO)$_q$— or

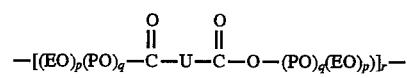

where EO represents —CH$_2$—CH$_2$—O—, PO represents

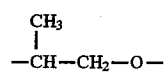

U represents —(CH$_2$)$_s$-where s has a value from 0 to 10 and r has a value such that the molecular weight of the OH terminated polymer is from 500 to about 100,000. The reaction may be brought about within a period from 1 minute to 5 hours by mixing the reactants at a temperature in the range of 25° C. to 150° C. Polymers according to the invention have their silyl groups bonded to the organic chain through a carbon linkage and have at least one ether-ester linkage in their organic backbone.

Polymers according to the invention can be produced simply and without use of platinum catalyst. Polymers according to the invention find use in many applications e.g. as coatings, adhesives and sealants. Preferred polymers according to the invention are formed from oxyalkylene polymers of well defined chain length and have at least one silyl end group having one, two or three silicon-bonded hydrolysable groups. The polymers may be blended with materials e.g. other polysiloxanes and may be compounded and used for similar purposes to other curable organic polymers. For example, a moisture curable composition may be formulated using oximo or alkoxy cure chemistry. A moisture curable composition comprising a preferred polymer according to the invention may comprise a material (C) which serves as a scavenger to eliminate excess moisture from the composition or which in presence of moisture is effective to cure the composition via a condensation reaction with the polymer. Suitable materials are those known for curing the corresponding alkoxy, acetoxy and oximo terminated polysiloxanes for example the orthosilicates and more particularly the hydrolysable silanes, for example a silane having two, three or four hydrolysable groups selected from the group consisting of acetoxy, oximo, alkoxy and alkenyloxy. Typical examples of suitable silanes are the di-, tri- and tetra-oximo silanes, the di-, tri- and tetra-alkoxy silanes, the alkenyloxy silanes and the mixed oximoalkoxysilanes. Examples of these silanes are methyltrioximosilane, vinyltri-oximo-silane, tetra-oximosilane, methyltriethoxysilane, methyl-trimethoxy-silane, vinyltrialkoxysilane, methyldioximo-alkoxysilane, vinyldioximoalkoxysilane, trioximoalkoxy-silane, oximo-trialkoxysilane and diamino-dioximosilane.

Such a curable composition may also, and preferably does, comprise a condensation catalyst for promoting condensation reaction of the polymer in presence of atmospheric moisture and material (C) when present, for example an organotin salt or titanium complex. Examples of suitable titanium complexes include titanium diiso-propyl diethyl acetoacetate, titanium diisopropoxy diacetyl acetonate and titanium tetra alkoxides where the alkoxide is butoxy or propoxy. The titanium complex may be employed in a proportion of approximately 0.2 part by weight per 100 parts by weight of the reaction product (A). Examples of suitable tin compounds include dibutyltindilaurate and tin octoate. The tin compounds may be employed in a proportion of approximately 0.02 to 0.2 part by weight per 100 parts by weight of the reaction product (A).

Such a curable compsition may also comprise one or more polysiloxanes having silicon-bonded hydroxyl groups R' as aforesaid, capable of taking part in the moisture cure condensation reaction. Other adjuvants may also be included; for example there may be incorporated into the composition plasticisers extenders, pigments such as titanium dioxide, carbon black and iron oxide and processing and adhesion promoting additives. Plasticisers and extenders which may be employed include the organic phthalte esters and non-functional end-capped polyalkylene oxides as well as the trimethylsilyl end-capped polydimethylsiloxane fluids (PDMS). Adhesion promoting additives may be employed if required for improving the adhesion of the cured composition to glass, metal or other substrates for example epoxy, amino and mercapto functional alkoxysilanes and certain reaction products and/or mixtures thereof.

Preparation of compositions can be effected by known mixing techniques. They may be formulated into single package or multiple package configurations as required. They may be prepared by mixing the selected components in any desired order. For example (A) and (B) may be reacted together and then mixed with the other components, or the reactants (A) and (B) may be mixed with other ingredients of the compositions and the reaction product produced in situ.

The following examples, in which the parts are expressed by weight and viscosity measurements at 25° C. are recited, have been selected to illustrate the invention by way of example.

EXAMPLE 1

Chain extension as a function of (Cl)/(OH) ratio 10 parts of polypropylene glycol(PPO), (MW=2000) were introduced into 100ml bottles and glutaryl dichloride (GD) added in amounts as shown in Table 1. The reaction mixtures were allowed to react for 2 hours at 120° C. at room pressure condition. Higher chain extension, as indicated from measurement of the viscosity of the product, was obtained when the (Cl)/(OH) ratio was close to 1. Ratios of below 1 are used in order to produce hydroxy endblocked polymer and ratios greater than 1 are used to produce an acid chloride endblocked acid chloride endblocked polymer.

TABLE 1

| Number | PPO Parts | GD Parts | (Cl)/(OH) | Viscosities cSt |
|---|---|---|---|---|
| 1 | 10 | 0.31 | 0.39 | 1250 |
| 2 | 10 | 0.40 | 0.50 | 2220 |
| 3 | 10 | 0.51 | 0.64 | 4760 |
| 4 | 10 | 0.60 | 0.76 | 9900 |
| 5 | 10 | 0.69 | 0.86 | 37860 |
| 6 | 10 | 0.79 | 0.99 | 369600 |
| 7 | 10 | 0.91 | 1.15 | 210180 |
| 8 | 10 | 1.00 | 1.26 | 35150 |
| 9 | 10 | 1.10 | 1.18 | 16300 |
| 10 | 10 | 1.20 | 1.50 | 9500 |

EXAMPLE 2

Chain extension and end-capping reaction 550 parts of polypropylene glycol (MW=4000) were introduced into a 1000ml reaction flask and dried at 120° C. 45 parts of adipoyle dichloride was then injected and allowed to react for 2 hours at 120° C. under reduced atmosphere of nitrogen. Hydrogen chloride resulting from the reaction was trapped in a 0.984 N KOH solution. After 2 hours the mixture was allowed to cool to 45° C. before addition of 200 parts of glycidoxypropyl-trimethoxysilane. Boron trifluoride etherate was used as catalyst and injected with a syringe under strong agitation. A polymer was obtained after 1 hour reaction and was identified by NMR analysis (H1 and Si$^{29}$) as trimethoxy-silylpropyl end-capped polypropylene glycol polyadipate copolymer with a viscosity of 10,000 cSt and a molecular weight of 14,500.

EXAMPLE 3

Sealant 20 parts of the polymer prepared in Example 2 was mixed with 24 parts of calcium carbonate, 4 parts of TiO$_2$, 10 parts of dioctylphthalate as plasticizer, 0.7 part of silica as thixotropic agent, 0.2 part Irganox as antioxidant, 0.8 part of methyltrimethoxysilane as a crosslinker and 0.2 part of tin octoate as a catalyst. The composition cured upon exposure to atmospheric moisture at room temperature and humidity; it developed a skin after 180 minutes and was tack free after 240 minutes. Cured samples of the composition demonstrated the following mechanical properties Elongation at break: 145%;
Modulus at 100%: 0.84 MPa;
Tensile: 1.23 MPa.

That which is claimed is:

1. A polymer prepared by reaction between (A) condensation reaction product of a linear alpha, omego-dihydroxyl polyoxyalkylene material having chain units $$-(CH-CH_2-O)_q-$$
$$\quad\;|$$
$$\;CH_3$$

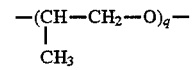

with or without chain units —(CH$_2$CH$_2$—O)$_p$— where p has a value of 0 to about 100 and g has a value of 1 to 300, with a diacid chloride of a saturated aliphatic dicarboxylic acid of the formula $$\begin{array}{cc} Cl & Cl \\ | & | \\ O=C-U-C=O \end{array}$$

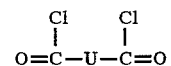

in which U represents —(CH$_2$)$_s$— where s has a value from 0 to 10, in proportions such that the ratio of chlorine of the acid chloride to hydroxyl groups of the polyoxyalkylene glycol is not greater than 1,to form an OH terminated reaction product of the polyacid chloride and the polyoxyalkylene glycol, and (B) a silane or siloxane having at least one oximo or epoxy group which reacts with a hydroxyl group of the reaction product of (A), and the remaining substituents of (B) are selected from the group consisting of alkyl, aryl, alkoxy, and acetoxy groups.

2. A polymer according to claim 1 wherein the silane or siloxane (B) also comprises at least one silicon-bonded oximo, alkoxy or acetoxy group.

3. A polymer according to claim 2 wherein the silane or siloxane is glycidoxypropyltrimethoxysilane.

4. A polymer according to claim 1 wherein the reaction product (A) comprises at least one ether-ester linkage.

5. A polymer according to claim 1 wherein s has a value of 3, 4 or 5.

6. A polymer according to claim 1 having at least one silicon-bonded hydrolysable group.

7. A curable composition comprising a polymer according to claim 6, a silane (C) different from the silane or siloxane (B) and which comprises two, three or four hydrolysable groups selected from the group consisting of acetoxy, oximo, alkoxy and alkenyloxy groups.

8. A composition according to claim 7 also comprising a condensation catalyst for promoting condensation reaction of the components of the composition in presence of atmospheric moisture.

* * * * *